F. W. MERRITT.
SHOCK ABSORBER.
APPLICATION FILED FEB. 13, 1909.
951,376.
Patented Mar. 8, 1910.
2 SHEETS—SHEET 1.
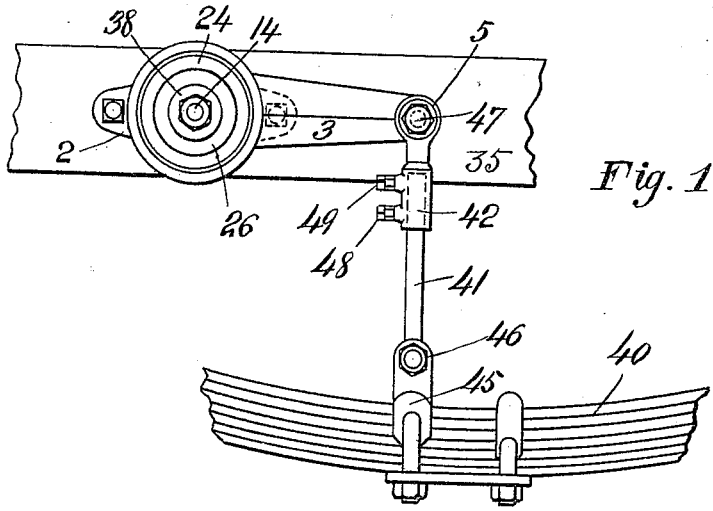
Fig. 1
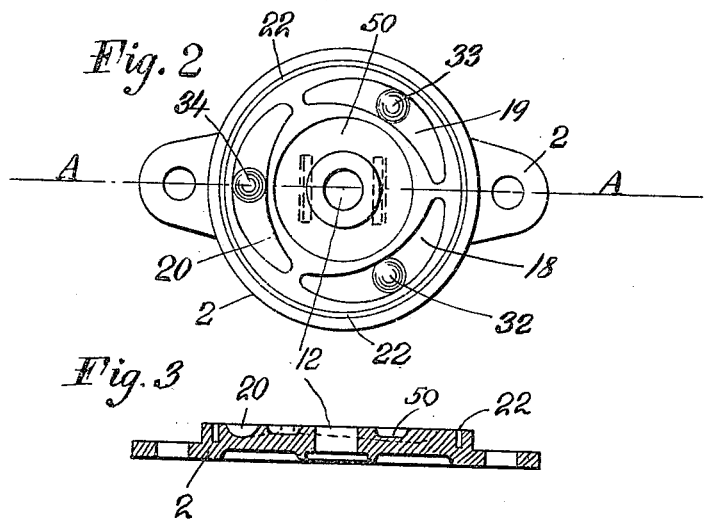
Fig. 2
Fig. 3
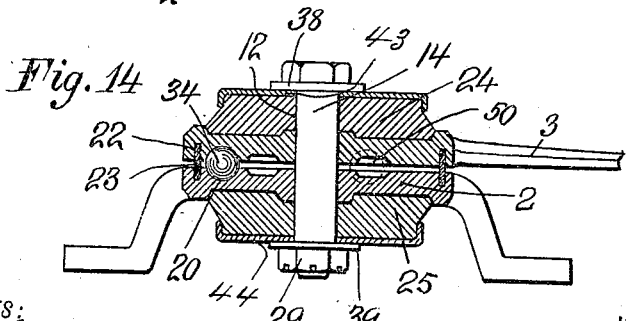
Fig. 14
WITNESSES:
INVENTOR
Frank W. Merritt,
BY
his ATTORNEY

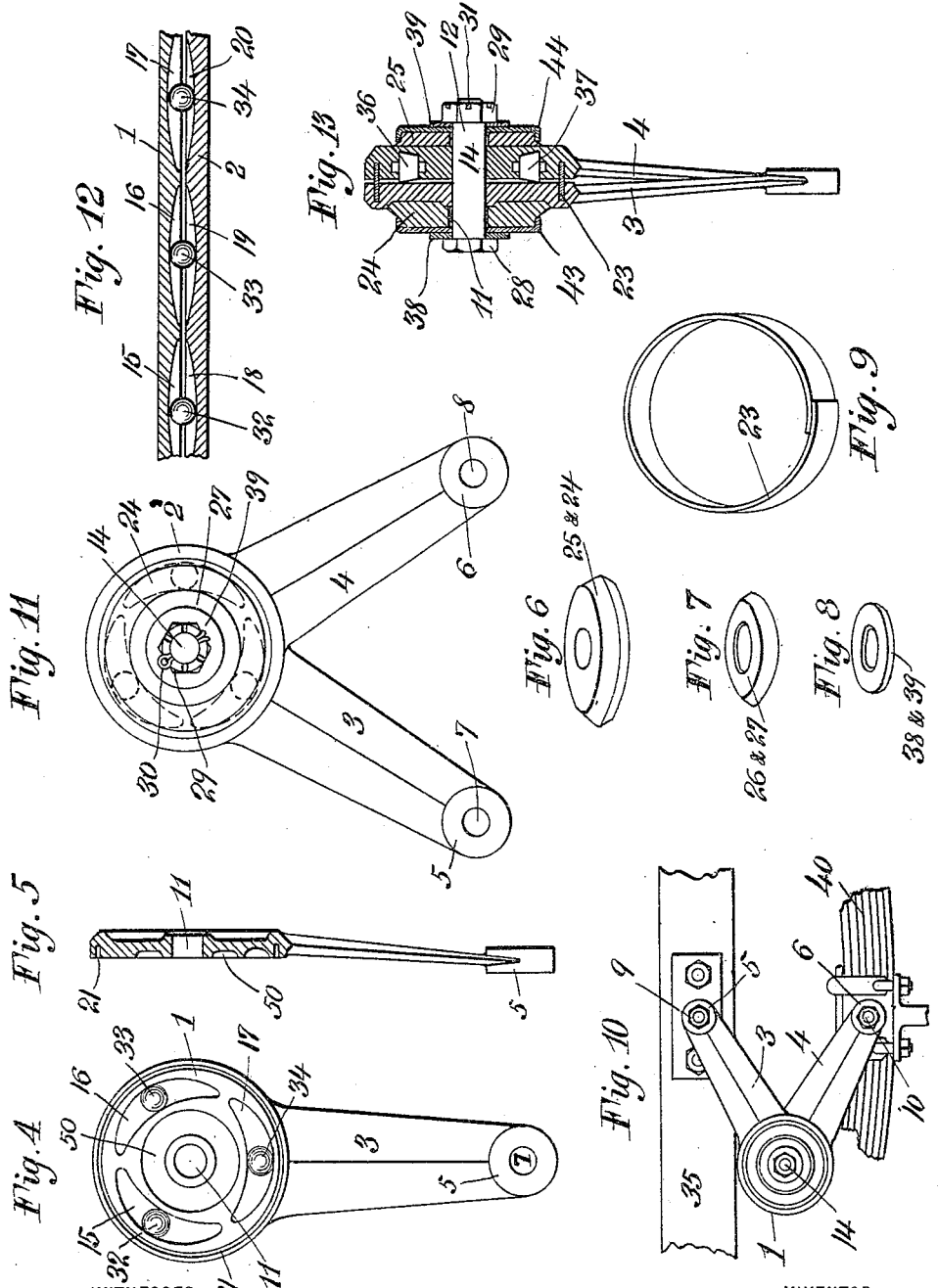

UNITED STATES PATENT OFFICE.

FRANK W. MERRITT, OF NEW YORK, N. Y., ASSIGNOR, BY MESNE ASSIGNMENTS, TO AUTO-APPLIANCE MANUFACTURING COMPANY, A CORPORATION OF NEW YORK.

SHOCK-ABSORBER.

951,376.  Specification of Letters Patent.  Patented Mar. 8, 1910.

Application filed February 13, 1909. Serial No. 477,493.

*To all whom it may concern:*

Be it known that I, FRANK W. MERRITT, a citizen of the United States, and resident of the borough of Manhattan, in the city, county, and State of New York, have invented certain new and useful Improvements in Shock-Absorbers, of which the following is a specification.

My invention relates to what are termed shock absorbers and it consists primarily in a pair of devices, one adapted to be secured to the axle or other part of the running gear and the other to the frame or body of the vehicle, each being arranged to register with the other and being secured so as to turn one upon the other, but with an elastic substance tending to hold them in normal position, a round or cylindrical body interposed between the opposed faces of the registering parts, and one or more cam faces against which the interposed body shall bear.

Figure 1 is a front elevation of a device embodying my invention, secured to a motor car (but partly shown). Fig. 2 is an interior face view of one of the members. Fig. 3 is a sectional view of the device of Fig. 2. Fig. 4 is an interior face view of another member of device. Fig. 5 is a sectional view of the disk part and an edge view of the arm of the device of Fig. 4. Fig. 6 represents the rubber spring I prefer to employ. Fig. 7 shows a compression plate. Fig. 8 a washer intended to relieve friction between the compression plate and the head of the bolt of the nut. Fig. 9 is a perspective view of the dust shield. Fig. 10 represents a modified form of the device. Fig. 11 is a view of the parts of the modified form assembled, showing the device from the side opposite to that shown in Fig. 10. Fig. 12 is a diagrammatic view representing sections of the two members placed in opposition, as they would appear if the circle were cut and bent to a straight line. Fig. 13 is a sectional view of a form of the device still further modified. Fig. 14 is a view, partly in full lines and partly in section, of a device in the main like Fig. 1, but showing the variety of compression plates already shown in Fig. 13.

It has been found by users of motor cars that the springs ordinarily employed are insufficient. The great weight of such vehicles, the fact that they are used upon roads and surfaces often uneven and the speed at which they are usually driven, produce a rapid succession of shocks which the ordinary springs do not fully and sufficiently cushion, consequently a demand has arisen for an additional or supplemental controller to lessen the jars incident to the operation of such cars, and it is for that purpose that my invention has been devised.

As here embodied in the device of Fig. 1, it consists of two disk like parts 1 and 2, preferably made of tempered steel, the first of which is provided with arm 3, and the other part (as shown) being provided with lugs, pierced with bolt holes, to permit it to be secured to the body of a vehicle or other desired place. The length of the arm depends somewhat upon the intended place of use, but eight inches or a little less from the center of the disk to the outer end of the arm is usually sufficient. The outer end 5 is preferably thicker than the web of the arm and is apertured, as at 7, to secure the fastening bolt, which is intended to secure that part of the device. The disks 1 and 2 usually about four inches in diameter, are apertured at 11, 12 to receive the bolt 14.

Concentric with the apertures 11 and 12 are double inclined cam faced recesses 15, 16, 17, 18, 19, 20, whose cross sections are preferably so formed as to exhibit true arcs of a circle, but whose depth is greatest at points preferably midway of their ends and decreases regularly to form inclined ways from those centers to each end, where they terminate abruptly but still retain partially spherical form, though I do not limit myself to such formation. Preferably there are three of these recesses in each member of the device, evenly spaced, with slight intervals between and so placed that in one member a radial line extending through the interval on the side nearest the arm, will be at an angle of 60° with the median line of said arm, while in the other, said radial line would parallel said median line of the superimposed arm, the result being that when they are placed face to face with the respective recesses of one disk opposite those of the other, the arm 3 will be horizontal. Beyond the recesses 15—20, both disks are preferably grooved, as at 21, 22, to receive a dust band 23.

On the outer face of disk 1 I place an annular rubber spring 24, clamped between the face of its adjacent disk on the one side and the inner face of a (preferably) dished compression plate 26, interposed between said spring and a washer 38, which in turn contacts with the head 28, of bolt 14, the nut 29 of said bolt being preferably secured by a cotter pin 30, extending through the bolt 14, and notches 31 cut in said nut; lubricant recesses are provided in each disk as shown at 50. To the spring 40, of the vehicle (or some other part connected rigidly with the axle) I secure a connecting rod 41, 42, by a clip 45, which is hinged to said rod at 46. The opposite end of the rod is jointed to the arm 3 by a pivot bolt 47. As shown, said rod is constructed in two pieces, one provided with a socket portion 42 into which the end of the other portion 41 fits snugly, being held therein by two set screws 48, 49. This arrangement permits of a ready adjustment of the device to fit spaces of different widths and the convenient taking up of any slack, without any cutting of the rod 41, 42.

The operation of the device is as follows: The disk 2 is secured to the frame or body of the car 35, and the end 5 of arm 3 on disk 1, to the rod 41, 42, which is in turn secured to the axle or some part rigidly connected thereto, as already noted, disk 1 having been placed over and closely facing, but not touching, disk 2, being held from contact by a series of balls 32, 33, 34, located then, at the deepest part of each recess 15—20. Outside of disk 1 is the rubber spring 24 held to place by the, preferably dished, compression plate 26 and washer 38 and all secured tightly together by the bolt 14. In assembling the device, the nut on said bolt is turned down so tightly that the parts are all held very firmly together. There is therefore a considerable force opposing the turning of one disk on the other, (which would happen if the body 35 approached or receded from the axle of the car and arm 3 moved up or down) for the reason that any such movement, as will be apparent from an inspection of Figs. 1, 2 and 12 would tend to move the deepest parts of the recesses of one disk away from those of the opposing disk, thus leaving less room in the immediately opposed parts of the respective recesses, for the balls. As they cannot yield to any appreciable extent, the disks must separate to permit their rotary movement, but such separation involves the compression of the rubber spring and that requires great force. Consequently the movement of one disk on the face of the other, around their common axis (represented by the bolt) is opposed by the stress of the spring. At the same time such movement is permitted by the fact that the opposition is that of a spring, which of course yields with a resistance which increases as the compression increases, with both impact and rebound. The result, as is manifest, is, that any tendency of the body of the superstructure to approach the so-called fixed support (the axle) or to move away from it, is restrained and at the same time cushioned as set forth, and the vehicle rides much easier, with consequent lessening of the wear of its parts. Simple inclined planes placed one upon another have a tendency to stick at some points, which greatly militates against their usefulness in such a device, since it is quite as necessary that the parts resume their usual positions, (after the shock) and become ready to receive and cushion a succeeding one, as it was that they should receive and cushion the first, but the use of the ball bearings between the disks entirely avoids the possibility of any such sticking.

In Figs. 10 and 11, I have shown a modification of the device aforesaid. Instead of securing one disk rigidly to the body, I provide each disk with arms, secure the end 5 of arm 3 to the body, and the end 6 of the other arm 4 to the axle or connected part, the disks being preferably adjusted with the arms, normally, at an angle of 60°, one to the other. I also, preferably, in such case, provide two rubber springs 24, 25, two compression plates 26, 27, and two washers 38, 39. I could equally well secure the end of arm 4 to the body of the vehicle and the end of arm 3 to the axle. But the action of the thus modified device is substantially similar to that already described. Beveled rollers 36, 37, two of which are shown in Fig. 13, would to a great degree accomplish the same result. The ends of the recesses 15—20, are preferably made abrupt to insure that no ball shall be turned out of its appropriate recess. If desired, the compression plates may extend entirely over the outer faces of the rubber springs, and be provided with flanges 43, 44, which substantially inclose a part, but not all of their circumferential faces, thus aiding their qualities of resistance and their quick return to normal form. As an equivalent, the disks may be flanged instead of the plates. Instead of similar recesses in each disk, I could make substantially hemi-spherical recesses in one and those of the form shown in Fig. 4, in the other and correspondingly construct a device having rollers in place of spheres, but in that event, the wear would be more localized and that I desire to avoid whenever convenient. I do not limit myself to rubber springs, nor to two springs.

What I claim as my invention and desire to secure by Letters Patent, is:

1. In a shock absorber, the combination of two disks adapted to be respectively secured, one to the body and the other to the running gear of a vehicle, and placed face to face and held together, one provided with a recess whose wall is in the form of inclined ways, the other with a recess adapted to retain a rotary bearing part, a rotary bearing part interposed between said disks and entering said respective recesses, a clamping device adapted to hold said disks together and a spring interposed between said clamping device and the disk.

2. In a shock absorber, the combination of two disks adapted to be respectively secured, one to the body and the other to the running gear of a vehicle and placed face to face and held together, one provided with a recess whose wall is in the form of double inclined ways, the other provided with a recess adapted to retain a rotary bearing part, a rotary bearing part interposed between said disks and entering said respective recesses, a clamping device adapted to hold said disks together and a spring interposed between said clamping device and the disk.

3. In a shock absorber, the combination of two disks adapted to be respectively secured, one to the body and the other to the running gear of a vehicle and placed face to face and held together, each provided with recesses whose walls form inclined ways adapted to retain a rotary bearing part, a rotary bearing part interposed between said disks and entering said respective recesses, a clamping device adapted to hold said disks together and a spring interposed between said clamping device and the disk.

4. In a shock absorber, the combination of two disks adapted to be respectively secured, one to the body and the other to the running gear of a vehicle, and placed face to face and held together, each provided with recesses whose walls form double inclined ways, adapted to retain a rotary bearing part, a rotary bearing part interposed between said disks and entering said respective recesses, a clamping device adapted to hold said disks together and a spring interposed between said clamping device and the disk.

5. In a shock absorber, the combination of two disks adapted to be respectively secured one to the body and the other to the running gear of a vehicle and placed face to face and held together, one provided with a recess whose wall is in the form of inclined ways, the other with a recess adapted to retain a spherical bearing part, a spherical bearing part interposed between said disks and entering said respective recesses, a clamping device adapted to hold said disks together and a spring interposed between said clamping device and the disk.

6. In a shock absorber, the combination of two disks adapted to be respectively secured to the body and the running gear of a vehicle, placed face to face and held together, one provided with a recess whose wall is in the form of inclined ways, the other with a recess adapted to retain a rotary bearing part, a rotary bearing part interposed between said disks and entering said respective recesses, a spring interposed between said clamping device and the disk and a dust guard extending from one disk to the other, substantially as set forth.

7. In a shock absorber, the combination of two disks adapted to be respectively secured, one to the body and the other to the running gear of a vehicle and placed face to face and held together, one provided with a recess whose wall is in the form of inclined ways, the other with a recess adapted to retain a rotary bearing part, a rotary bearing part interposed between said disks and entering said respective recesses, a clamping device adapted to hold said disks together, a spring interposed between said clamping device and the disk, a bolt passing through the parts, a nut on one end and a head on the other end of said bolt and washers interposed respectively between the clamping plate and the bolt-head and the clamping plate and the nut.

8. In a shock absorber, the combination of two disks adapted to be respectively secured, one to the body and the other to the running gear of a vehicle and placed face to face and held together, one provided with a recess whose wall is in the form of inclined ways, the other with a recess adapted to retain a rotary bearing part, a rotary bearing part interposed between said disks and entering said respective recesses, a clamping device adapted to hold said disks together and a rubber spring interposed between said clamping device and the disk.

9. In a shock absorber, the combination of two disks adapted to be respectively secured, one to the body and the other to the running gear of a vehicle and place face to face and held together, one provided with a recess whose wall is in the form of inclined ways, the other with a recess adapted to retain a rotary bearing part, a rotary bearing part interposed between said disks and entering said respective recesses, a clamping device adapted to hold said disks together and including a compression plate extending over the outer face, and a flange extending over a part of the circumferential edge of the spring of the device.

10. In a shock absorber, the combination of two disks adapted to be respectively secured, one to the body and the other to the running gear of a vehicle and placed face to face and held together, each provided with recesses whose walls form double inclined ways with the deepest parts of the respective recesses set opposite each other, adapted to retain a rotary bearing part, a rotary bearing part interposed between said disk and entering said respective recesses, a clamping device adapted to hold said disks together and a spring interposed between said clamping device and the disk.

11. In a shock absorber, the combination of two disks adapted to be respectively secured, one to the body and the other to the running gear of a vehicle and placed face to face and held together, each provided with recesses whose walls form double inclined ways with the deepest parts of the respective recesses set opposite to each other, adapted to retain a spherical bearing part, a spherical bearing part interposed between said disks and entering said respective recesses, a clamping device adapted to hold said disks together and a spring interposed between said device and the disk.

12. In a shock absorber, the combination of two parts, adapted to be secured together and also adapted to be respectively secured, directly or indirectly, one to the body and the other to the running gear of a vehicle, one part provided with a recess whose wall is in the form of inclined ways, the other with a recess adapted to retain a rotary bearing part, a rotary bearing part interposed between said recessed parts and entering said respective recesses, a clamping device adapted to hold said recessed parts together and a spring interposed between a recessed part and a holding part of the clamp.

13. In a shock absorber, the combination of two parts, adapted to be secured together and also adapted to be respectively secured one to the body and the other to the running gear of a vehicle, one part provided with inclined ways, a bearing piece making contact with said ways, a clamping device adapted to hold said parts together, a spring interposed between one of said parts and the clamping part and an adjusting rod secured to an arm of the shock absorber and constituting a part of the connection to the vehicle, all substantially as set forth.

Signed at New York in the county of New York and State of New York this 10th day of February A. D. 1909.

FRANK W. MERRITT.

Witnesses:
HAROLD C. KNOEPPEL,
A. G. N. VERMILYA.